United States Patent
Wang et al.

(10) Patent No.: US 9,749,943 B2
(45) Date of Patent: Aug. 29, 2017

(54) METHOD, SYSTEM AND ELECTRONIC APPARATUS FOR SEARCHING NEARBY APPARATUS

(71) Applicant: Acer Incorporated, New Taipei (TW)

(72) Inventors: Po-Hsiang Wang, New Taipei (TW);
Yi-Wen Liu, New Taipei (TW);
Hao-Ting Chang, New Taipei (TW);
Wen-Ping Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/428,160

(22) Filed: Feb. 9, 2017

(65) Prior Publication Data
US 2017/0150432 A1    May 25, 2017

Related U.S. Application Data

(62) Division of application No. 14/810,491, filed on Jul. 28, 2015.

(30) Foreign Application Priority Data

Mar. 24, 2015 (TW) .............................. 104109356 A
Mar. 24, 2015 (TW) .............................. 104109357 A
May 8, 2015 (TW) .............................. 104114721 A

(51) Int. Cl.
*H04B 7/00* (2006.01)
*H04W 48/16* (2009.01)
*H04W 48/14* (2009.01)
*H04L 12/26* (2006.01)
*H04B 17/318* (2015.01)
*H04W 84/12* (2009.01)

(52) U.S. Cl.
CPC .......... *H04W 48/16* (2013.01); *H04B 17/318* (2015.01); *H04L 43/16* (2013.01); *H04W 48/14* (2013.01); *H04W 84/12* (2013.01)

(58) Field of Classification Search
USPC .......................... 455/41.1–41.3, 456.1, 515
See application file for complete search history.

(56) References Cited

U.S. PATENT DOCUMENTS

| | | | |
|---|---|---|---|
| 8,711,737 B2 * | 4/2014 | Kandekar | G06Q 30/0251 370/265 |
| 8,792,825 B2 * | 7/2014 | Miyabayashi | H04W 4/02 370/338 |
| 2012/0252516 A1 * | 10/2012 | Miyabayashi | H04W 4/02 455/515 |

(Continued)

*Primary Examiner* — Fayyaz Alam
(74) *Attorney, Agent, or Firm* — Jianq Chyun IP Office

(57) ABSTRACT

A method, a system and an electronic apparatus for searching nearby apparatuses are proposed. The method includes: searching at least one first apparatus belonging to a first subnet which the electronic apparatus belongs to, and accordingly generating a first list; scanning at least one access point (AP) near the electronic apparatus, and accordingly generating a first AP list; uploading the first AP list to a server, and receiving a second list from the server, where the second list includes at least one second apparatus, and a similarity between a second AP list of each second apparatus and the first AP list is higher than a predetermined threshold; and uniting the first list and the second list to generate a pairing list including at least one apparatus to be paired.

8 Claims, 8 Drawing Sheets

(56) References Cited

U.S. PATENT DOCUMENTS

2014/0206382 A1* 7/2014 Shabtay ................ G01S 5/0289
  455/456.1
2015/0223188 A1* 8/2015 Baek ..................... H04W 4/008
  455/456.1
2016/0359960 A1* 12/2016 Chen ........................ H04B 5/00

* cited by examiner

METHOD, SYSTEM AND ELECTRONIC APPARATUS FOR SEARCHING NEARBY APPARATUS

CROSS-REFERENCE TO RELATED APPLICATION

This application is a divisional application of and claims the priority benefit of U.S. application Ser. No. 14/810,491, filed on Jul. 28, 2015, now allowed, which claims the priority benefit of Taiwan application serial no. 104114721, filed on May 8, 2015, Taiwan application serial no. 104109356, filed on Mar. 24, 2015, and Taiwan application serial no. 104109357, filed on Mar. 24, 2015. The entirety of each of the above-mentioned patent applications is hereby incorporated by reference herein and made a part of this specification.

BACKGROUND

Field of the Invention

The invention is directed to a method and an electronic apparatus for searching an apparatus and more particularly, to a method, a system and an electronic apparatus for searching a nearby apparatus.

Description of Related Art

With the development of technologies and the progress of the times, mobile apparatuses, such as smart phones and tablet computers (tablet PCs), have become indispensable in people's lives. In order to deal with different usage habits, a user may own multiple mobile apparatuses. For conveniently transmitting or synchronizing data, files or applications in each apparatus to another apparatus, one of the current technologies is to allow the apparatuses to perform data exchange through a cloud service (e.g., Google drive or Dropbox). However, most of these cloud services require users to register and login accounts, which cause inconvenience to the users.

In addition, in the current technologies, there are also protocols serving for the pairing and data exchange between different apparatuses, such as a multicast domain name system (mDNS) protocol or a simple service discovery protocol (SSDP); however, through these protocols, the apparatus can only get the apparatuses that belong to the same subnet. Namely, in case two or more apparatuses belong to different subnets (e.g., served by different access points or routers), these apparatuses cannot perform the pairing and the data exchange operations through the protocols. Moreover, these apparatuses may not discover each other even in the same subnet due to the routers being set inappropriately.

SUMMARY

Accordingly, the invention provides a method and an electronic apparatus for providing a pairing list, by which an apparatus belongs to a subnet same as or different from the subnet that the electronic apparatus belongs to can be searched, so as to generate a better pairing list.

According to an embodiment, the invention is directed to a method for generating a pairing list adapted to an electronic apparatus, which includes: searching at least one first apparatus belonging to a first subnet which the electronic apparatus belongs to, and accordingly generating a first list; scanning at least one access point (AP) near the electronic apparatus, and accordingly generating a first AP list; uploading the first AP list to a server, and receiving a second list returned from the server, wherein the second list includes at least one second apparatus, and a similarity between a second AP list of each second apparatus and the first AP list is higher than a predetermined threshold; and uniting the first list and the second list to generate a pairing list including at least one apparatus to be paired.

According to an embodiment, the invention is directed to an electronic apparatus for generating pairing list, which includes a storage unit, a communication unit and a processing unit. The storage unit stores a plurality of modules. The processing unit is connected with the storage unit and the communication unit, and is configured to access and execute the modules. The modules include a searching module, a scanning module, a transmitting module and a generating module. The searching module is configured to search at least one first apparatus belonging to a first subnet which the electronic apparatus belongs to, and accordingly generate a first list. The scanning module is configured to control the communication unit to scan at least one AP near the electronic apparatus, and accordingly generate a first AP list. The transmitting module is configured to upload the first AP list to a server, and receive a second list returned from the server, wherein the second list includes at least one second apparatus, and a similarity between a second AP list of each second apparatus and the first AP list is higher than a predetermined threshold. The generating module is configured to unite the first list and the second list to generate a pairing list including at least one apparatus to be paired.

According to an embodiment, the invention is directed to a method for pairing, adapted to an electronic apparatus. The method includes: generating a pairing list including at least one apparatus to be paired; performing a proximity detection to search at least one nearby apparatus near the electronic apparatus; determining whether one of the at least one nearby apparatus is identical to a first apparatus to be paired among the at least one apparatus to be paired; and when the one of the at least one nearby apparatus is identical to the first apparatus to be paired, pairing with the first apparatus to be paired.

According to an embodiment, the invention is directed to a method for searching a nearby apparatus, adapted for searching a nearby apparatus located near a first apparatus. The method includes the following steps: searching at least one hotspot nearby by using a wireless communication technique, obtaining an identifier of each hotspot to generate a first identifier set, and uploading the first identifier set to a server by the first apparatus; searching at least one hotspot nearby by using the wireless communication technique, obtaining the identifier of each hotspot to generate a second identifier set, and uploading the second identifier set to the server by at least one second apparatus respectively; calculating a similarity between the first identifier set and each second identifier set by the server; and determining whether a corresponding second apparatus is the nearby apparatus located near the first apparatus according to the similarity, and providing a determination result to the first apparatus by the server.

According to an embodiment, the invention is directed to system for searching a nearby apparatus. The system for searching the nearby apparatus includes a first apparatus, at least one second apparatus and a server. The first apparatus searches at least one hotspot nearby by using a wireless communication technique, and obtains an identifier of each hotspot to generate a first identifier set. The at least one second apparatus respectively searches at least one hotspot nearby by using the wireless communication technique, obtaining the identifier of each hotspot to generate a second identifier set. The server is coupled with the first apparatus and the second apparatus, and is configured to receive the first identifier set uploaded by the first apparatus and the second identifier set uploaded by the second apparatus, calculate a similarity between the first identifier set and each second identifier set, and determine whether a corresponding second apparatus is a nearby apparatus located near the first apparatus according to the similarity, and provides a determination result to the first apparatus.

To sum up, the method and the electronic apparatus provided by the embodiments of the invention can contribute to not only getting the first apparatus belonging to the same subnet, but also obtaining each second apparatus located physically nearby through the second list (even though some of the second apparatuses may belong to subnets different from the subnet which the electronic apparatus belongs to).

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
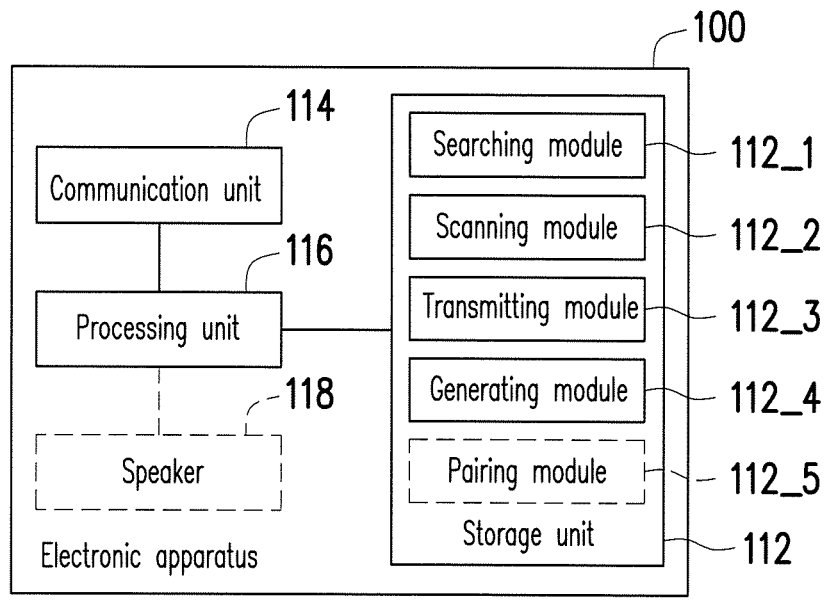
FIG. 1 is a schematic diagram illustrating an electronic apparatus according to an embodiment of the invention.

FIG. 1 is a schematic diagram illustrating an electronic apparatus according to an embodiment of the invention. In the present embodiment, an electronic apparatus 100 is, for example, a cellular phone, a smart phone, a personal computer (PC), a notebook PC, a netbook PC, a tablet PC, a TV, a game console, a portable apparatus, a portable multimedia player, and so on. The electronic apparatus 100 includes a storage unit 112, a communication unit 114 and a processing unit 116.

The storage unit 112 may be a memory, a hard drive or any other component that may serve for storing data and may be configured to record a plurality of program codes or modules. The communication unit 114 may be configured to process radio frequency (RF) signals of the cellular communication technologies, e.g., global system for mobile (GSM), third generation project partnership long term evolution (3GPP LTE), code division multiple access (CDMA), wideband CDMA (WCDMA), high speed packet access (HSPA), and world interoperability for microwave access (WiMAX), etc. Besides, the communication unit 114 may further process RF signals of wireless local area network (WLAN) communication technologies.

The communication unit 114 may provide the electronic apparatus 100 with a communication function by including components, such as but not limited to a transmitter circuit, a receiver circuit, an analog-to-digital (A/D) converter, a digital-to-analog (D/A) converter, a low noise amplifier (LNA), mixers, filters, matching circuits, transmission lines, a power amplifier (PA), one of more antenna units, and a local storage medium.

The processing unit 116 is coupled with the storage unit 112 and the communication unit 114. The processing unit 116 may be a general purpose processor, a special purpose processor, a conventional processor, a digital signal processor (DSP), a plurality of microprocessors, one or more microprocessors in association with a DSP core, a controller, a microcontroller, application specific integrated circuits (ASICs), field programmable gate array (FPGA) circuits, any other type of integrated circuit (IC), a state machine, an ARM-based processor, and the like.

In the present embodiment, the processing unit 116 may access a searching module 112_1, a scanning module 112_2, a transmitting module 112_3 and a generating module 112_4 stored by the storage unit 112 to execute a method for generating a pairing list provided by the invention.

Figure 2:
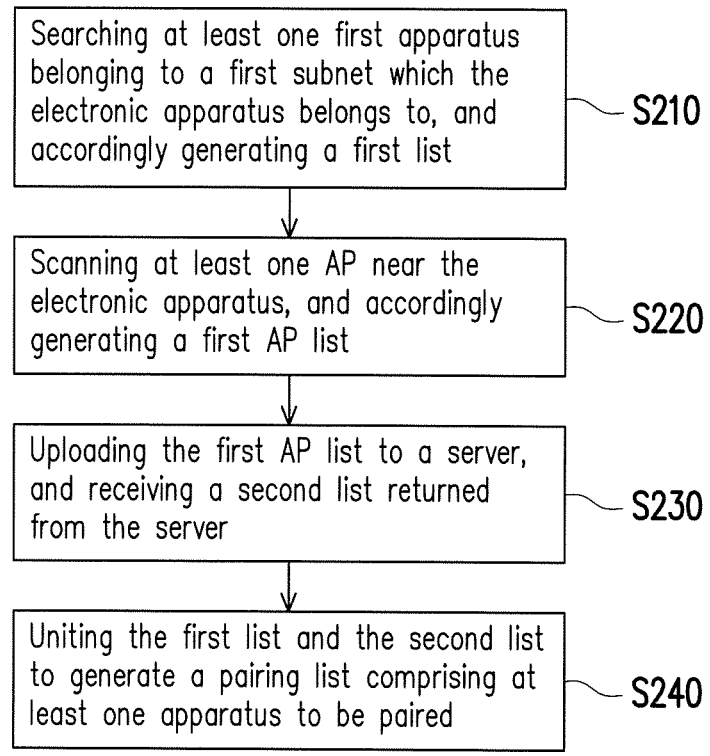
FIG. 2 is a flowchart illustrating a method for generating a pairing list according to an embodiment of the invention.

FIG. 2 is a flowchart illustrating a method for generating a pairing list according to an embodiment of the invention. The method provided in the present embodiment may be performed by the electronic apparatus 100 of FIG. 1, and detailed steps of the method will be described with reference to each component depicted in FIG. 1.

In step S210, the searching module 112_1 may search at least one first apparatus belonging to a first subnet which the electronic apparatus 100 belongs to, and accordingly, generates a first list. In an embodiment, the first subnet may be, for example, a local area network provided by a first access point (AP), and different subnets may be, for example, local area networks provided by different APs. In this circumstance, the searching module 112_1 may discover or search other first apparatuses which are also served by the first AP by executing a protocol, e.g., a multicast DNS (mDNS) protocol, a simple service discovery protocol (SSDP) or any other similar protocol. Then, the searching module 112_1 may gather each of the discovered first apparatuses in the first list. In an embodiment, the first list may record various identification information of each first apparatus including, for example, but not limited to, an instance identification, an Internet Protocol (IP) address, or a unique identifier (e.g., a Globally Unique Identifier (GUID)).

Additionally, in other embodiments, the electronic apparatus 100 may perform step S210 only after entering a paring page under the control by a user, but the embodiments of the invention are not limited thereto.

In step S220, the scanning module 112_2 may scan at least one AP near the electronic apparatus, and accordingly, generate a first AP list. In an embodiment, the first AP list may record various identification information of each AP, for example, but not limited to, Service Set Identifier (SSID) or Basic Service Set Identifier (BSSID).

In step S230, the transmitting module 112_3 may upload the first AP list to the server and receive a second list returned from the server. The server may be, for example, a data center constructed in a cloud network, a cloud server or any other similar server apparatus or server system. In an embodiment, besides receiving the first AP list from the electronic apparatus 100, the server may also receive AP lists from other apparatuses. Then, the server may find out an AP list which is similar to the first AP list from the AP lists uploaded from other apparatuses and gather apparatuses corresponding to the AP list in the second list. For descriptive convenience, apparatuses included in the second list are referred to as second apparatuses.

In an embodiment, the server may calculate a similarity between the AP list uploaded by another apparatus and the first AP list. When an AP list having a similarity with the first AP list higher than a predetermined threshold (e.g., 50%) appears, the server may define the apparatuses corresponding to the AP list as second apparatuses and put them in the second list.

To be detailed, when two different apparatuses have similar AP lists, it represents that the two apparatuses are located near each other. Namely, the transmitting module 112_3 may find out the apparatuses (i.e., the second apparatuses) which are physically near (e.g., in the same floor) the electronic apparatus 100 based on the second list returned from the server. Meanwhile, even though some of the second apparatuses belong to a subnet different from the subnet which the electronic apparatus 100 belongs to, the server may find out the second apparatuses based on the aforementioned teaching, and inform electronic apparatus 100 through the second list.

Afterwards, in step S240, the generating module 112_4 may unite the first list and the second list to generate a pairing list including at least one apparatus to be paired. To be specific, since each first apparatus in the first list and each second apparatus in the second list may be duplicate, the generating module 112_4 may prevent the apparatuses to be paired from repeatedly appearing in the pairing list through performing step S240.

In brief, through the method provided by the embodiment of the invention, besides finding out each first apparatus belonging to the same subnet, the electronic apparatus 100 may further obtain each second apparatus which is physically located nearby through the second list (even though some of the second apparatuses may respectively belong to subnets different from the subnet which the electronic apparatus 100 belongs to). According to another aspect, when the user intends to pair the electronic apparatus 100 owned thereby with another apparatus (e.g., a notebook PC), the method provided by the embodiment of the invention may allow the electronic apparatus 100 to have a greater possibility to serve the notebook PC as the apparatuses to be paired and put it in the generated pairing list for a subsequent pairing operation.

In other embodiments, since the pairing list may include a great number of apparatuses to be paired, the apparatus to be paired which is the physically nearest to the electronic apparatus 100 may be selected from the apparatuses to be paired by using a SoundTrigger technique in the invention, so as to improve an efficiency of the subsequent pairing operation, which will be further described below.

Figure 3:
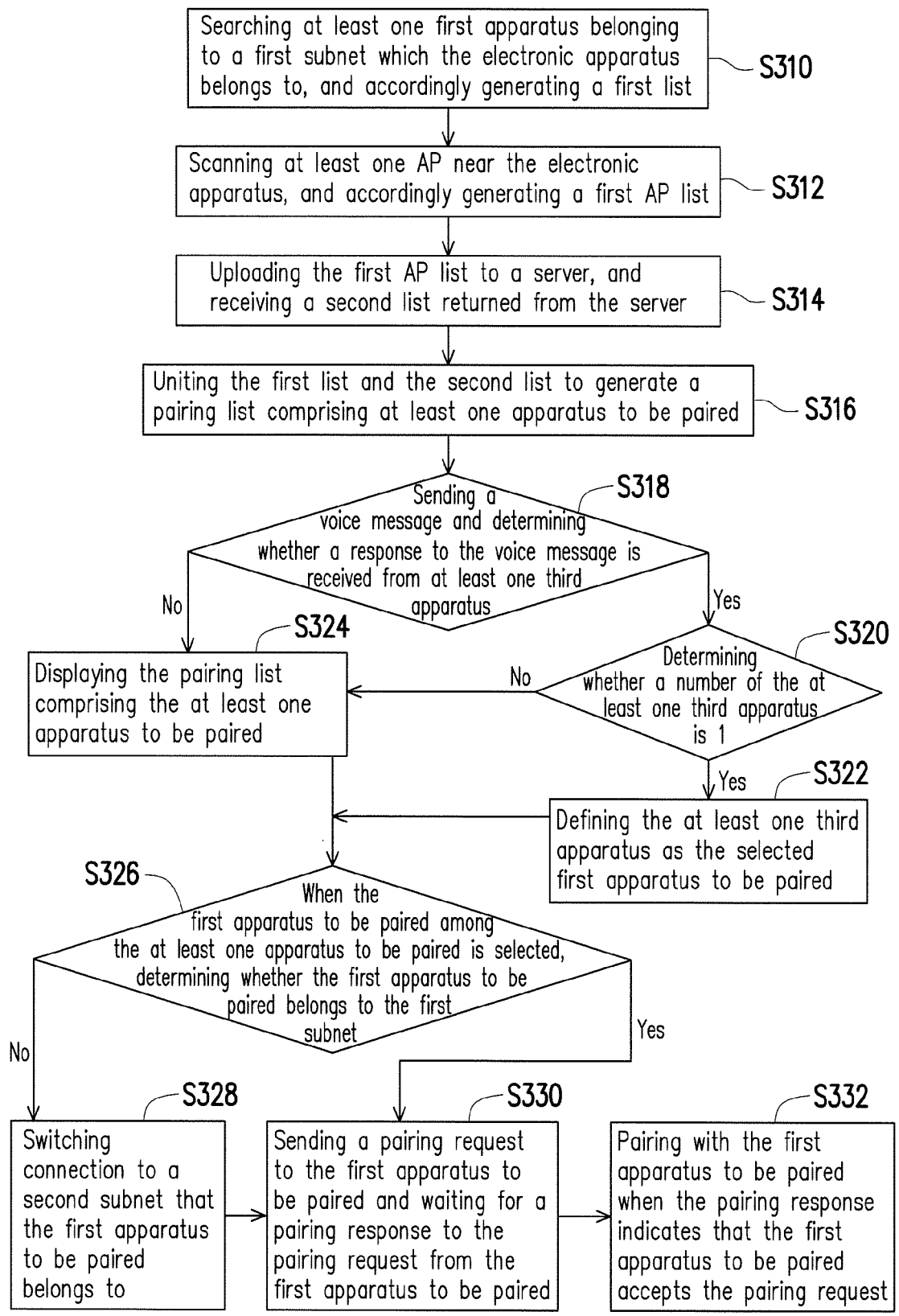
FIG. 3 is a schematic diagram of the pairing operation according to an embodiment of the invention.

Referring to FIG. 3, FIG. 3 is a schematic diagram of the pairing operation according to an embodiment of the invention. The method provided in the embodiment may be performed by the electronic apparatus 100 of FIG. 1, and detailed steps of the method will be described with reference to each component depicted in FIG. 1. Details of steps S310 to S316 may refer to the descriptions related to steps S210 to S240 in FIG. 2, which will not be repeated. In an embodiment, the electronic apparatus 100 may further includes a speaker 118, and the storage unit 112 may further include a pairing module 112_5 configured to perform steps S318 to S332, which are specifically described below.

In step S318, the pairing module 112_5 may control the speaker 118 to send a voice message and may determine whether a response to the voice message is received from at least one third apparatus. In an embodiment, the voice message may be identification information (e.g., an instance identification) of the electronic apparatus 100 which is encoded into a high-frequency sound signal by the pairing module 112_5. The high-frequency voice message may have a frequency (e.g., 25000 Hz) imperceptible to human ears and may be transmitted within a range from 0.5 to 1 meter, for example, but the invention is not limited thereto.

In the present embodiment, the at least one third apparatus may be, for example, the apparatus to be used by the user for pairing with the electronic apparatus 100, which may receive the voice message from the speaker 118 through a microphone unit. When receiving the voice message, the at least one third apparatus may obtain the identification information of the electronic apparatus 100 from the voice message and send the response to the electronic apparatus 100 through a network or the server, for example. In an embodiment, when the user is to pair the electronic apparatus 100 with the at least one third apparatus, the user may respectively switch the two to the pairing page. When the at least one third apparatus is in the pairing page, the microphone unit may be turned on to receive the voice message, but the invention is not limited thereto.

Due to a short transmission distance of the voice message, if the electronic apparatus 100 receives a response to the voice message from the at least one third apparatus, it represents that a distance between the two apparatuses is short, such that the two apparatuses may be probably targets to be paired of each other. Thus, in step S320, the pairing module 112_5 may determine whether a number of the at least one third apparatus is 1. If yes, it represents that the third apparatus is the target to be paired with the electronic apparatus 100, and thus, the pairing module 112_5 may continue to define the third apparatus as a selected first apparatus to be paired in step S322.

On the other hand, if the number of the at least one third apparatus is not 1, it represents that there may be a plurality of possible paring targets nearby, and thus, the pairing module 112_5 may display the pairing list including the at least one apparatus to be paired in step S324 for the user to select a correct apparatus to be paired therefrom. Additionally, when, in step S318, receiving no response, the pairing module 112_5 may also continue to perform step S324 for the user to select the correct apparatus to be paired from the paring list.

Then, in step S326, when the first apparatus to be paired is selected from the apparatuses to be paired, the pairing module 112_5 may determine whether the first apparatus to be paired belongs to the first subnet. If yes, the pairing module 112_5 may control the communication unit 114 to send a pairing request to the first apparatus to be paired in step S330, and wait for a pairing response to the pairing request from the first apparatus to be paired. On the other hand, if the first apparatus to be paired does not belong to the first subnet, in step S328, the pairing module 112_5 may control the communication unit 114 to switch connection to a second subnet that the first apparatus to be paired belongs to, and then step S330 follows.

Then, in step S332, when the pairing response indicates that the first apparatus to be paired accepts the pairing request, the pairing module 112_5 may pair with the first apparatus to be paired.

According to the teachings of the two embodiments described above, the method provided by the embodiments of the invention can achieve pairing two apparatuses easily for the user, without any account registration or login process. Meanwhile, through the mechanism provided by the embodiments above, the method provided by the embodiments of the invention still can achieve finding out the two apparatuses for pairing with each other, even though the two apparatuses respectively belong to different subnets.

In other embodiments, when there is no network connection between the electronic apparatus 100 and the first apparatus to be paired that the electronic apparatus 100 is to pair with, or the network connection environment is in a bad condition, the electronic apparatus 100 may also output its identification information in a quick response (QR) code, such that the first apparatus to be paired may read the QR code by using a camera module equipped therewith. Then, the electronic apparatus 100 may perform step S326 to S332 in the same way to complete the pairing with the first apparatus to be paired, but the invention is not limited thereto.

In other embodiments, in the invention, the apparatus to be paired that is nearer to the electronic apparatus may be smartly selected from the pairing list, so as to improve the pairing efficiency.

Figure 4:
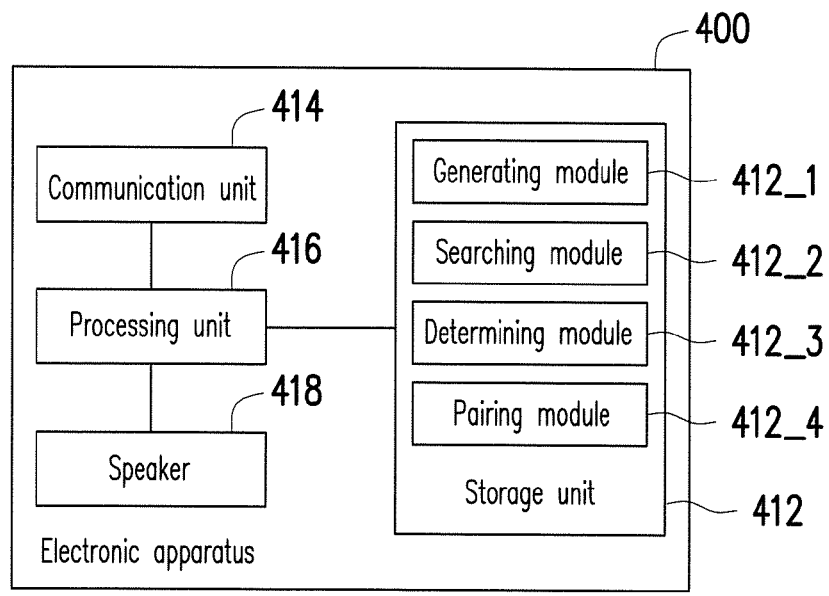
FIG. 4 is a schematic diagram illustrating an electronic apparatus according to an embodiment of the invention.

Referring to FIG. 4, FIG. 4 is a schematic diagram illustrating an electronic apparatus according to an embodiment of the invention. In the present embodiment, an electronic apparatus 400 includes a storage unit 412, a communication unit 414, a processing unit 416 and a speaker 418. Implementations of the electronic apparatus 400 and each possible example of the components thereof may refer to the descriptions related to FIG. 1, which will not be repeated hereinafter. The processing unit 416 may access a generating module 412_1, a searching module 412_2, a determining module 412_3 and a pairing module 412_4 stored in the storage unit 412 to perform a method for providing a pairing list provided by the invention.

Figure 5:
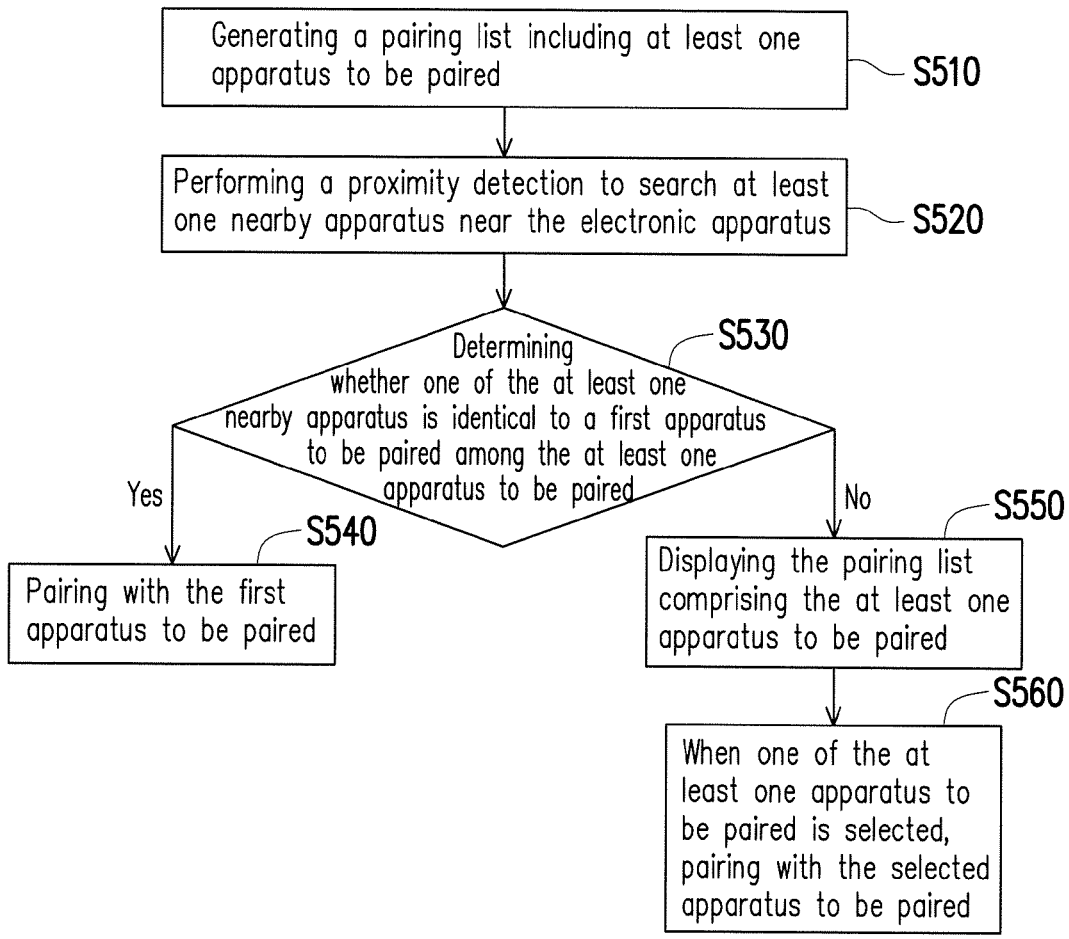
FIG. 5 is a flowchart illustrating a method for pairing according to an embodiment of the invention.

FIG. 5 is a flowchart illustrating a method for pairing according to an embodiment of the invention. The method provided by the present embodiment may be performed by the electronic apparatus 400 of FIG. 4, and detailed steps of the method will be described with reference to each component depicted in FIG. 4.

In step S510, the generating module 412_1 may generate a pairing list including at least one apparatus to be paired. In an embodiment, the pairing list is generated according to the related teachings from the embodiments of FIG. 2 and FIG. 3. In other embodiments, the pairing list may be a list including apparatuses to be paired which are identified by the generating module 412_1 executing a technique, such as Bluetooth discovery and Universal Plug and Play (UPnP), but the invention is not limited thereto.

Then, in step S520, the searching module 412_2 may execute proximity detection to search at least one nearby apparatus near the electronic apparatus 400. The proximity detection includes, for example, the Bluetooth 4.0 and high-frequency dissemination technologies, which may not be limited in the embodiment. To be specific, the searching module 412_2 may detect a distance between the electronic apparatus 400 and each nearby apparatus thereof based on a proximity profile defined in the Bluetooth 4.0 specifications, so as to identify a nearby apparatus that is the nearest to the electronic apparatus 400. In addition, the searching module 412_2 may also control the speaker 418 to send the voice message (e.g., the short-distance and high-frequency voice message with a frequency imperceptible to human ears) that is taught in the embodiments above. As described above, when a certain nearby apparatus capable of receiving the voice message is in the pairing page, the nearby apparatus may correspondingly transmit a response to the electronic apparatus 400. Specific details thereof may refer to the teachings from the embodiments above, which will not be repeated hereinafter.

In step S530, the determining module 412_3 may determine whether one of the at least one nearby apparatus is identical to the first apparatus to be paired among the at least one apparatus to be paired. The one of the at least one nearby apparatus is, for example, a nearby apparatus that is the nearest to the electronic apparatus 400, but the invention is not limited thereto. In the present embodiment, if the one of the at least one nearby apparatus is identical to the first apparatus to be paired among the at least one apparatus to be paired, it represents that the first apparatus to be paired is the apparatus that the electronic apparatus 400 is to pair with. Thus, the pairing module 412_4 may continue to pair with the first apparatus to be paired in step S540. Details of step S540 may refer to the teaching from the embodiment in illustrated in FIG. 3, which will not be repeated hereinafter.

On the other hand, if the at least one nearby apparatus is totally different from the at least one apparatus to be paired, the pairing module 412_4, in step S550, may display the pairing list including the at least one apparatus to be paired for the user to select the apparatus to be paired that he/she wants to pair. Thereafter, in step S560, when one of the at least one apparatus to be paired is selected, the pairing module 412_4 may pair with the one of the at least one apparatus to be paired. Similarly, the specific details may still refer to the teaching from the embodiment illustrated in FIG. 3 and will not be repeated hereinafter.

On the other hand, the invention utilizes a characteristic that neighboring apparatuses would search the same hotspots, in which a plurality of apparatuses respectively searches hotspots located nearby, and sets of identifiers of the searched hotspots are uploaded to the server, for the server to determine whether the apparatuses are nearby apparatuses. Therein, the server may calculate a similarity of the identifier sets and then sort the hotspots using detected signal intensities of the hotspots, which may assist the user of the electronic apparatus to locate an apparatus that is located nearby for subsequent connection or other interactions.

Figure 6:
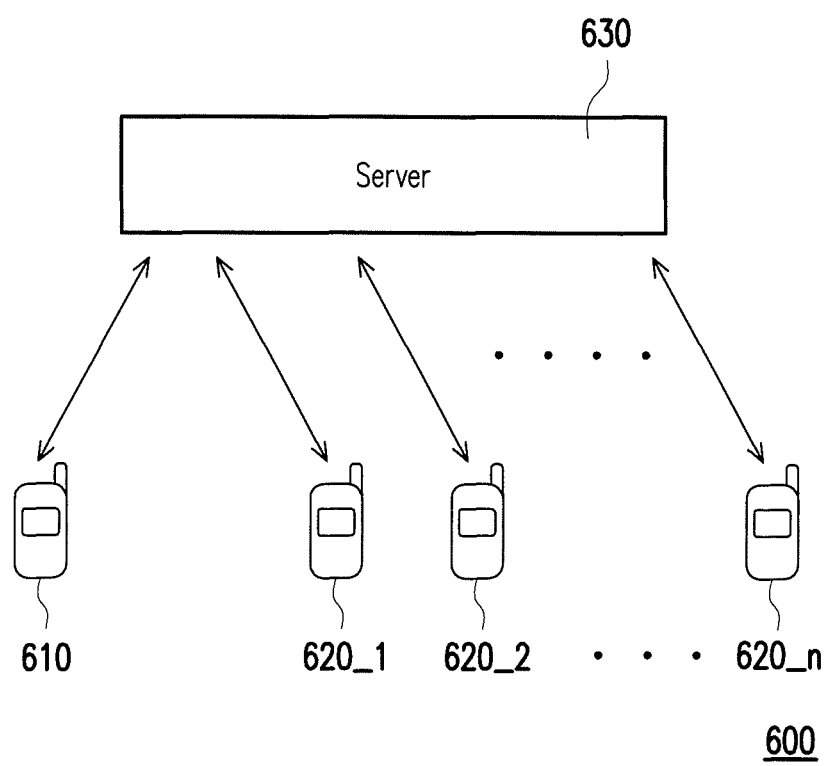
FIG. 6 is a schematic diagram illustrating a system for searching nearby apparatuses according to an embodiment of the invention.

FIG. 6 is a schematic diagram illustrating a system for searching nearby apparatuses according to an embodiment of the invention. Referring to FIG. 6, a system 600 of the present embodiment includes a first apparatus 610, at least one second apparatus (illustrated as second apparatuses 620_1 to 620_n for example, but the invention is not limited thereto) and a server 630. In the present embodiment, the first apparatus 610 and the second apparatuses 620_1 to 620_*n* are, for example, smart phones, tablet PCs, notebook PCs or other similar electronic apparatuses, but the invention is not limited thereto. The server 630 is connected with the first apparatus 610 and the second apparatuses 620_1 to 620_*n* through, for example, a network, and the server may be a PC, a workstation, a sever, or any other type of PC or processing apparatus which is configured at a service end, but the invention is not limited thereto.

Figure 7A:
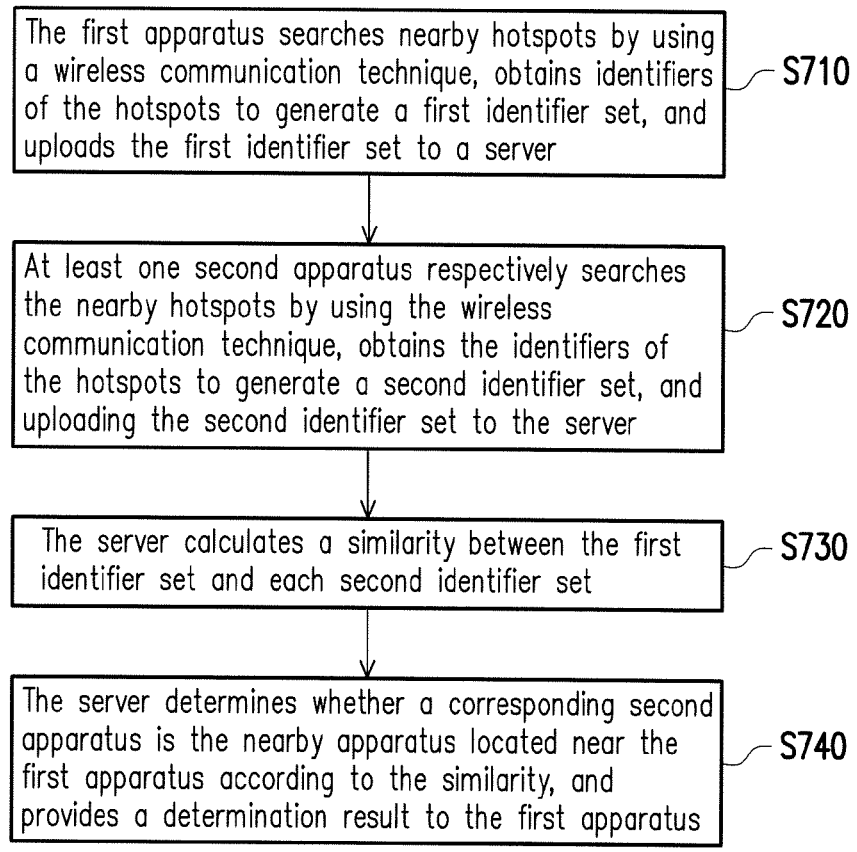
FIG. 7A is a flowchart illustrating a method for searching a nearby apparatus according to an embodiment of the invention.
Figure 7B:
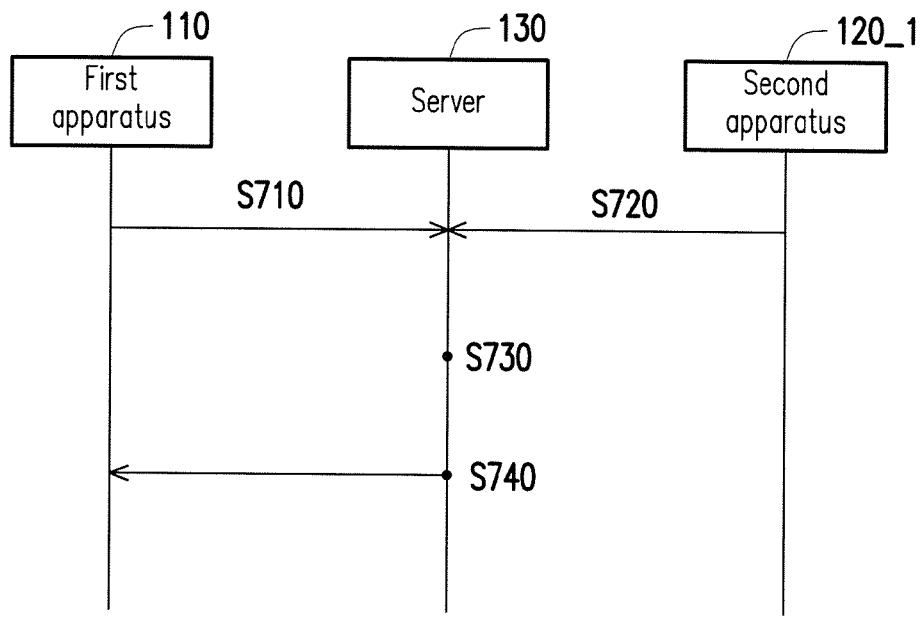
FIG. 7B illustrates an execution apparatus and a receiving apparatus of each step of the method depicted in FIG. 7A.

FIG. 7A is a flowchart illustrating a method for searching a nearby apparatus according to an embodiment of the invention. FIG. 7B illustrates an execution apparatus and a receiving apparatus of each step of the method depicted in FIG. 7A, in which the first apparatus 610, the second apparatus 620_1 and the server 630 illustrated in FIG. 6 are taken as examples for describing each step of the method for searching the nearby apparatus according to the embodiments of the invention.

Referring to both FIG. 7A and FIG. 7B, in step S710, the first apparatus 610 searches at least one hotspot nearby by using a wireless communication technique to obtain an identifier of each of the at least one hotspot to generate a first identifier set and uploads the first identifier set to the server 630.

In the embodiments of the invention, the first apparatus 610 may search hotspots located nearby through, for example, Wireless Fidelity (WiFi). It should be noted therein that a medium access control (MAC) address (i.e., a basic service set identifier (BSSID)) of a WiFi hotspot is unique to each hotspot, thus, the hotspots nearby the first apparatus 610 are searched through WiFi, and the MAC address of each hotspot is used as the identifier for distinguishing the detected hotspots. When the first apparatus 610 obtains the identifier of each hotspot, the first identifier set may be accordingly generated and uploaded to the server 630.

In step S720, each of the second apparatuses 620_1 to 620_*n* may search hotspots located nearby by using the wireless communication technique to obtain identifiers of the hotspots to generate second identifier sets and upload the second identifier sets to the server 630.

In step S730, the server 630 calculates a similarity between the first identifier set and each second identifier set. In the present embodiment, the server 630 determines whether the first apparatus 610 and the second apparatus 620_1 are located nearby according to the similarity between a first identifier set searched by the first apparatus 610 and a second identifier set searched by the second apparatus 620_1. In the present embodiment, the similarity between a first identifier set and a second identifier set is a value obtained by calculating an intersection cardinality of the first identifier set and the second identifier set divided by a union cardinality of the first identifier set and the second identifier set. The calculation of the similarity may be expressed by the following formula:

$$S = \frac{A \cap B}{A \cup B},$$

where A represents the first identifier set, B represents one of the second identifier sets, and S represents the similarity between the first identifier set and the second identifier sets.

In step S740, the server 630 determines whether each of the corresponding second apparatuses 620_1 to 620_*n* is a nearby apparatus located near the first apparatus 610 according to the similarity and provides a result of the determination to the first apparatus 610. Thereafter, the first apparatus 610 may obtain information of the nearby apparatus and connect with the nearby apparatus for interactions. In order to describe step S740 in a more detailed way, step S740 is further divided into steps S810 to S820 according to the embodiments of the invention.

Figure 8:
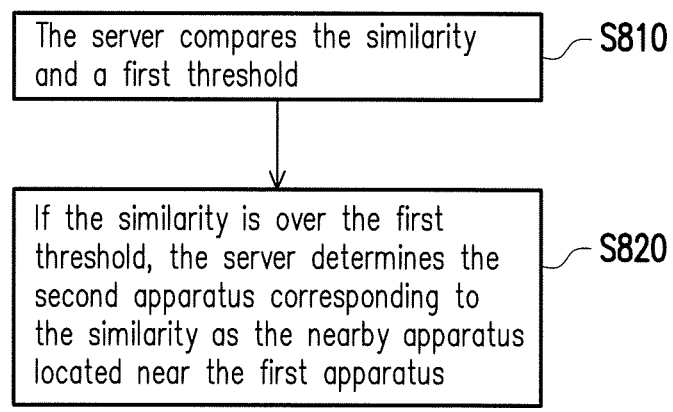
FIG. 8 is a flowchart illustrating a method for determining whether a apparatus corresponding to the similarity is a nearby apparatus according to the similarity according to an embodiment of the invention.

Referring to FIG. 8, FIG. 8 is a flowchart illustrating a method for determining whether an apparatus corresponding to a similarity is a nearby apparatus according to the similarity according to an embodiment of the invention. In step S810, the server 630 compares the similarity with a first threshold. The first threshold may be set according to environmental requirements and may fall within a range from 0.01 to 0.1, for example, but the invention is not limited thereto. When the server 630 determines that the similarity is over the first threshold, the first apparatus 610 and the second apparatus 620_1 may be determined as nearby apparatuses of each other; otherwise, may be determined as not nearby apparatuses.

In step S820, if the similarity is over the first threshold, the server 630 may determine that the second apparatus 620_1 corresponding to the similarity is the nearby apparatus located near the first apparatus 610, and provide the determination result to the first apparatus 610. Thereafter, the first apparatus 610 may obtain that the second apparatus 620_1 is located nearby according to the determination result returned by the server 630, so as to interact with the second apparatus 620_1.

In brief, in the embodiments of the invention, an apparatus may search the hotspots located nearby through WiFi to obtain the identifiers of the hotspots to generate the identifier sets and upload the identifier sets to the server. The server may, through calculating the similarity between the sets, determine whether the corresponding apparatus is the nearby apparatuses and accordingly respond to the inquiring apparatus. Accordingly, the method for searching the nearby apparatus can contribute to locating the apparatuses located nearby through the wireless communication technique existing in the apparatuses.

Figure 9:
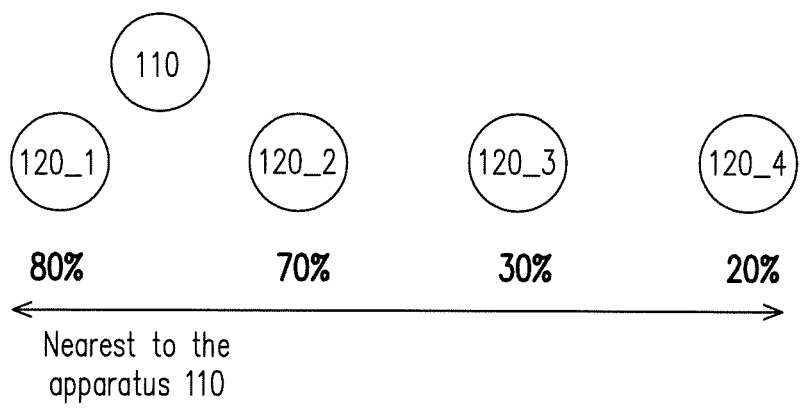
FIG. 9 is a schematic diagram illustrating similarities between the at least one second apparatus and the first apparatus according to an embodiment of the invention.

In addition, FIG. 9 is a schematic diagram illustrating similarities between the second apparatuses 620_1 to 620_4 and the first apparatus 610 according to an embodiment of the invention. In another embodiment of the invention, the server 630 may not only determine whether the first apparatus 610 and each of the second apparatuses 620_1 to 620_4 are nearby apparatuses according to whether the similarity is over the threshold, but also sort the second apparatuses 620_1 to 620_4 according to the similarities to obtain the second apparatuses 620_1 to 620_4 from the nearest to farthest to the first apparatus 610.

For instance, referring to FIG. 9, the similarities between the second apparatuses 620_1 to 620_4 and the first apparatus 610 are, 80%, 70%, 30%, and 20%, respectively. Thereby, the server may determine the second apparatus 620_1 as the apparatus nearest to the first apparatus 610, and the second apparatus 620_4 as the apparatus farthest from the first apparatus 610. In this way, the first apparatus 610 may correctly locate the apparatus nearby according to the sorting result.

Figure 10A:
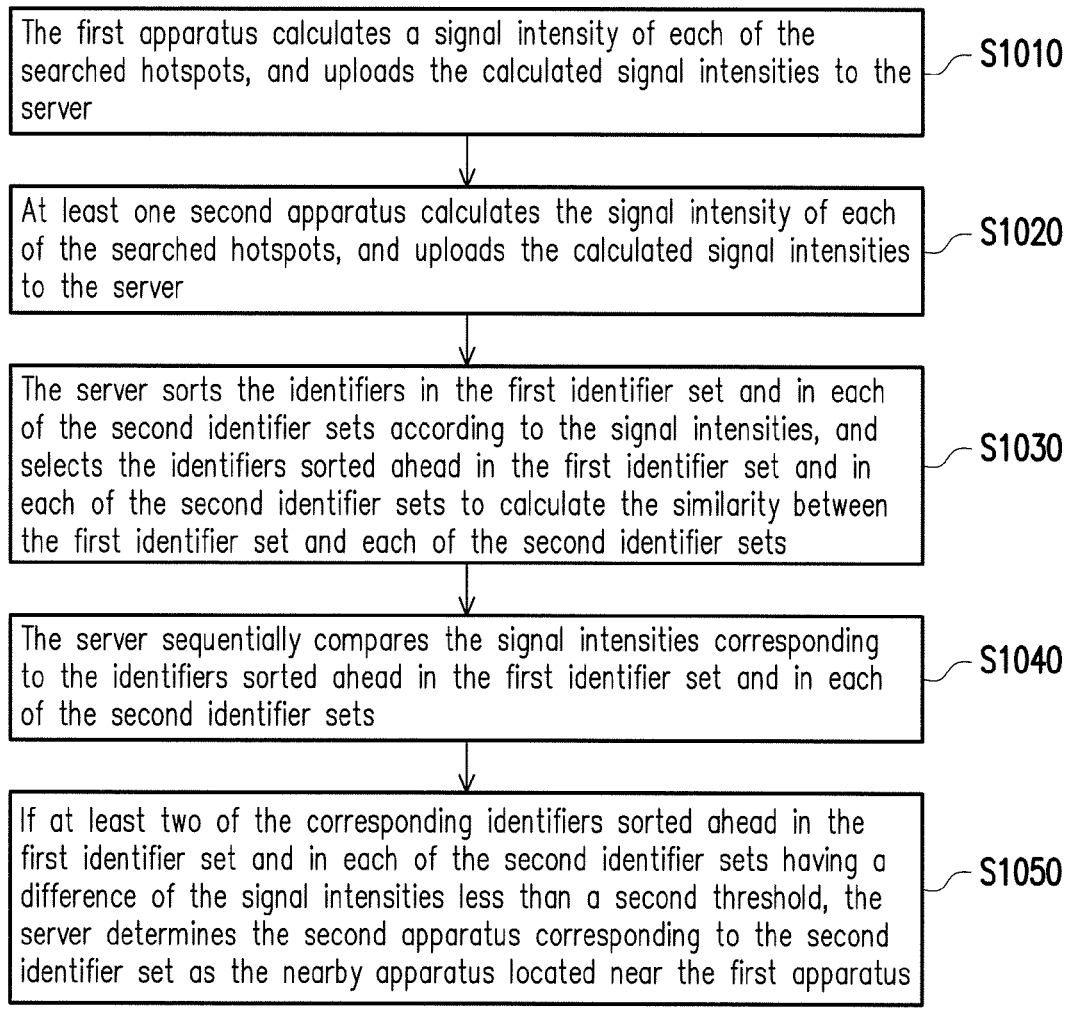
FIG. 10A is a flowchart illustrating a method for searching a nearby apparatus according to another embodiment of the invention.
Figure 10B:
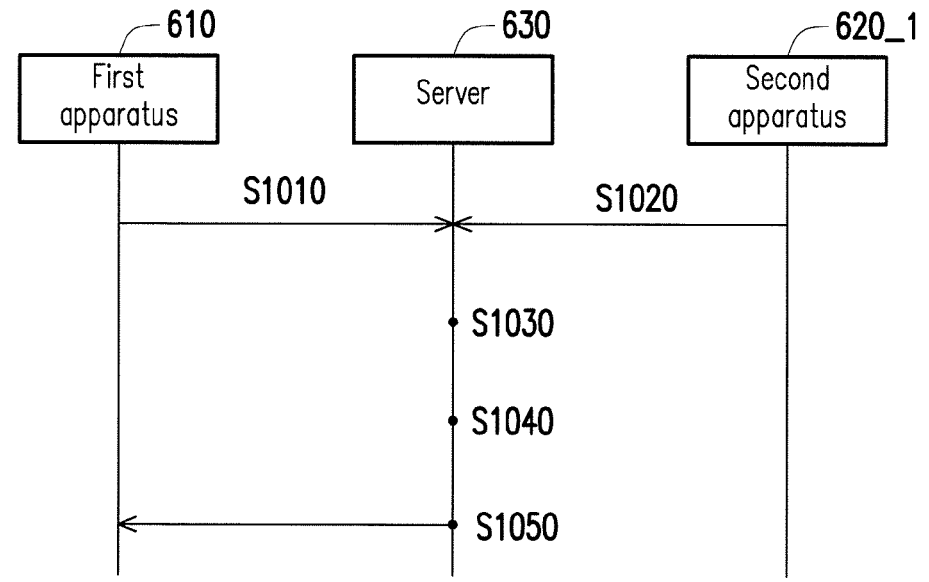
FIG. 10B illustrates an execution apparatus and a receiving apparatus of each step of the method depicted in FIG. 10A.

In another embodiment of the invention, the nearby apparatuses may also be determined by a technique combining signal intensities of the detected hotspots. Referring to FIG. 10A and FIG. 10B, FIG. 10A is a flowchart illustrating a method for searching a nearby apparatus according to another embodiment of the invention. FIG. 10B illustrates an execution apparatus and a receiving apparatus of each step of the method depicted in FIG. 10A. The method provided by the present embodiment may also be performed by the first apparatus 610, the second apparatus 620_1 and the server 630 illustrated in FIG. 6 in the same way, in which the first apparatus 610, the second apparatus 620_1 and the server 630 illustrated in FIG. 6 are taken as examples for describing each step of the method for searching the nearby apparatus depicted in FIG. 10A and FIG. 10B.

Referring to both FIG. 10A and FIG. 10B, in step S1010, the first apparatus 610 calculates a signal intensity of each searched hotspot and upload it to the server 630. In step S1020, at least one second apparatus (e.g. the second apparatus 620_1) calculates a signal intensity of each searched hotspot and upload it to the server 630.

The first apparatus 610 and the second apparatus 620_1 may detect the signal intensities of the nearby hotspots through WiFi in the same way. In the present embodiment, a signal intensity is, for example, a WiFi received signal strength indicator (WiFi RSSI), but the invention is not limited thereto. The WiFi RSSI may serve to indicate a signal intensity of a searched hotspot.

Being different from the aforementioned embodiment, the first apparatus 610 and the second apparatus 620_1 not only obtain the identifier of each detected hotspot and generate the first identifier set and the second identifier sets according to the searched identifiers, but also detect signal intensities of the hotspots and upload the first identifier set, the second identifier sets together with the signal intensity corresponding to each hotspot to the server 630.

In step S1030, the server 630 first sorts the identifiers in the first identifier set and in each second identifier set according to the signal intensities, selects a plurality of identifiers that are sorted ahead in the first identifier set and in each second identifier set, and calculates the similarity between the first identifier set and each second identifier set.

According to the signal intensities of the hotspots, a distance from an apparatus to a hotspot may be inferred, and the higher the signal intensity of the detected hotspot is, the nearer the apparatus is from the hotspot. Thus, in the present embodiment, through serving the detection of the signal intensity of each hotspot as an aid, the server 630 may first sort the identifiers in the first identifier set and in each second identifier set according to the signal intensities, select a plurality of identifiers sorted ahead (e.g., the former 5 identifiers) from the first identifier set and from each second identifier set to select the hotspots that are located nearlier, and calculate the similarity between the first identifier set and each second identifier set only based on the identifiers, so as to determine the nearby apparatus. The calculation of the similarities is the same as that in step S730 of the previous embodiment, which will not be repeatedly described.

In step S1040, the server 630 may further sequentially compare the signal intensities corresponding to the identifiers sorted ahead in the first identifier set and in each second identifier set, for example. In step S1050, if a difference between the signal intensities corresponding to at least two of the identifiers sorted ahead in the first identifier set and in each second identifier set is less than a second threshold, it may be further confirmed that the second apparatus 620_1 corresponding to the second identifier set is a nearby apparatus located near the first apparatus 610. In the present embodiment, the second threshold may also be set according to environmental requirements in the same way, but the invention is not limited thereto.

In the present embodiment, besides whether the first apparatus 610 and the second apparatus 620_1 are located near to each other may be determined according to the similarity between the first identifier set searched by the first apparatus 610 and the second identifier set, whether they are nearby apparatuses of each other may be confirmed in combination with the comparison of the signal intensities.

Figure 11:
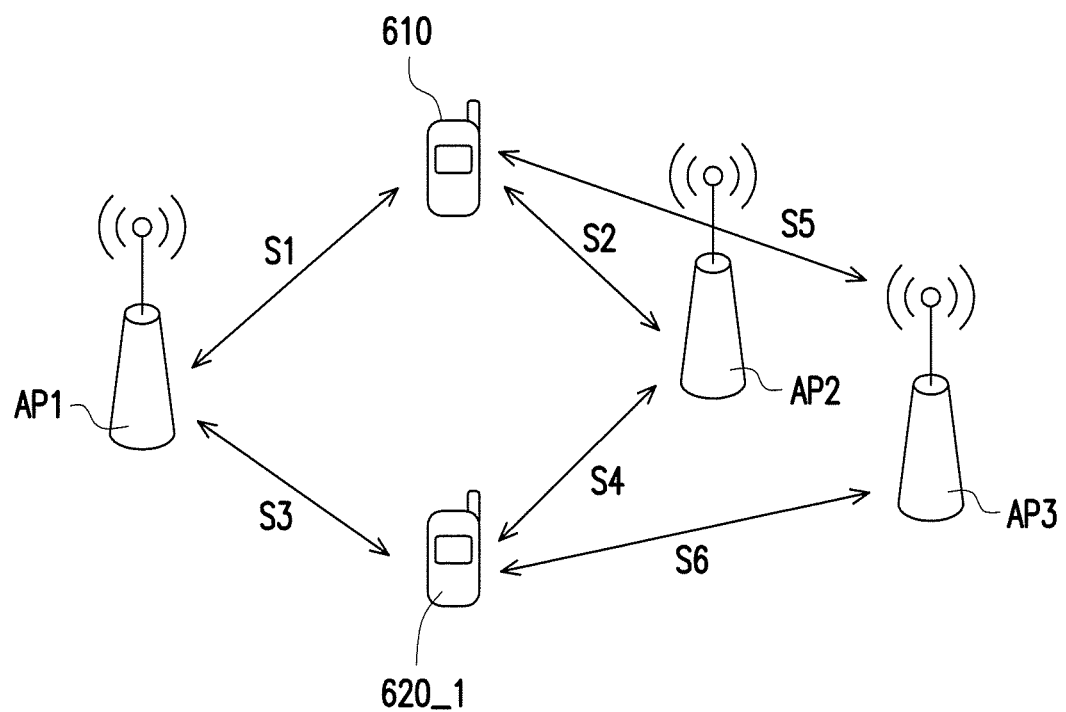
FIG. 11 is a schematic diagram illustrating nearby apparatuses according to an embodiment of the invention.

For instance, FIG. 11 is a schematic diagram illustrating nearby apparatuses according to an embodiment of the invention. Referring to FIG. 11, the first apparatus 610, the second apparatus 620_1 and hotspots AP1 to AP3 located nearby are illustrated. Table 1 shown below lists three identifiers of the hotspots whose corresponding signal intensities are sorted ahead in the identifier sets respectively searched by the first apparatus 610 and the second apparatus 620_1 and the signal intensities S1 to S6 thereof.

TABLE 1

| Identifier set of first apparatus 610 | Signal intensity | Identifier set of the second apparatus 620_1 | Signal intensity |
|---|---|---|---|
| AP1 | S1 | AP1 | S3 |
| AP2 | S2 | AP2 | S4 |
| AP3 | S5 | AP3 | S6 |

Therein, since the identifier sets of both the first apparatus 610 and the second apparatus 620_1 include the identifiers of AP1 to AP3, it may be determined that the identifier set of the first apparatus 610 and the identifier set of second apparatus 620_1 have a high similarity. In this case, the signal intensities corresponding to the hotspots AP1 to AP3 detected by the first apparatus 610 are compared with the signal intensities corresponding to the hotspots AP1 to AP3 detected by the second apparatus 620_1, so as to confirm whether the first apparatus 610 and the second apparatus 620_1 are the apparatuses nearby each other. When the server 630 calculates a difference between the signal intensities corresponding to at least two identifiers that are sorted ahead in the first identifier set and the second identifier set is less than the second threshold (e.g., both |S3−S1| and |S4−S2| are less than the second threshold), it may be confirmed that the first apparatus 610 and the second apparatus 620_1 are the apparatuses nearby each other. In the present embodiment, through the combination of the similarities and the signal intensities, it may be further confirmed that the second apparatus 620_1 is the nearby apparatus located near the first apparatus 610.

In view of the foregoing, the methods provided by the embodiments of the invention can achieve pairing two apparatuses easily for the user, without any account registration or login process. Moreover, the methods provided by the embodiments of the invention still can achieve finding out the two apparatuses for pairing with each other, even though the two apparatuses respectively belong to different subnets.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for searching a nearby apparatus, adapted for searching the nearby apparatus located near a first apparatus, comprising:

searching at least one hotspot nearby by using a wireless communication technique, obtaining an identifier of each hotspot to generate a first identifier set, calculating a signal intensity of each hotspot, and uploading the first identifier set and the calculated signal intensities to a server by the first apparatus;

searching at least one hotspot nearby by using the wireless communication technique, obtaining the identifier of each hotspot to generate a second identifier set, calculating the signal intensity of each hotspot, and uploading the second identifier set and the calculated signal intensities to the server by at least one second apparatus respectively;

sorting the identifiers in the first identifier set and in each of the second identifier sets according to the signal intensities, and selecting a plurality of identifiers sorted ahead in the first identifier set and in each of the second identifier sets to calculate a similarity between the first identifier set and each second identifier set by the server;

determining whether a corresponding second apparatus is the nearby apparatus located near the first apparatus according to the similarity, and providing a determination result to the first apparatus by the server;

sequentially comparing the signal intensities corresponding to the identifiers sorted ahead in the first identifier set and in each of the second identifier sets by the server; and if at least two of the identifiers sorted ahead in the first identifier set and in each of the second identifier sets having a difference of the signal intensities less than a second threshold, determining the second apparatus corresponding to the second identifier set as the nearby apparatus located near the first apparatus.

2. The method according to claim 1, wherein the step of determining whether the corresponding second apparatus is the nearby apparatus located near the first apparatus according to the similarity by the server comprises:

comparing the similarity and a first threshold by the server; and if the similarity is over the first threshold, determining the second apparatus corresponding to the similarity as the nearby apparatus located near the first apparatus by the server.

3. The method according to claim 1, wherein the step of determining whether a corresponding second apparatus is the nearby apparatus located near the first apparatus according to the similarity by the server further comprises:

sorting the second apparatuses according to the similarities to obtain the second apparatuses from the nearest to farthest to the first apparatus.

4. A system for searching a nearby apparatus, comprising:

searching at least one hotspot nearby by using a wireless communication technique, obtaining an identifier of each hotspot to generate a first identifier set, and uploading the first identifier set to a server by the first apparatus;

a first apparatus, configured to search at least one hotspot nearby by using a wireless communication technique, obtaining an identifier of each hotspot to generate a first identifier set, and to calculate a signal intensity of each hotspot;

at least one second apparatus, respectively configured to search at least one hotspots by using the wireless communication technique, obtaining an identifier of each hotspot to generate a first identifier set, and to calculate the signal intensity of each hotspot;

a server, coupled with the first apparatus and the second apparatus, and configured to receive the first identifier set and the calculated signal intensities uploaded by the first apparatus and the second identifier set and the calculated signal intensities uploaded by the second apparatus, the server further sorts the identifiers in the first identifier set and in each of the second identifier sets according to the signal intensities, and selects the identifiers sorted ahead in the first identifier set and in each of the second identifier sets to calculate a similarity between the first identifier set and each second identifier set, and determine whether a corresponding second apparatus is a nearby apparatus located near the first apparatus according to the similarity, and providing a determination result to the first apparatus, wherein the server further sequentially compares the signal intensities corresponding to the identifiers sorted ahead in the first identifier set and in each of the second identifier sets, and if at least two of the identifiers sorted ahead in the first identifier set and in each of the second identifier sets having a difference of the signal intensities less than a second threshold, determines the second apparatus corresponding to the second identifier set as the nearby apparatus located near the first apparatus.

5. The system according to claim 4, wherein the server further compares the similarity with a first threshold, and determines the second apparatus corresponding to the similarity as the nearby apparatus located near the first apparatus if the similarity is over the first threshold.

6. The system according to claim 4, wherein the server further sorts the second apparatuses according to the similarities to obtain the second apparatuses from the nearest to farthest to the first apparatus.

7. The system according to claim 4, wherein the server comprises calculating the similarity between the first identifier set and each second identifier set by using a formula of:

$$S = \frac{A \cap B}{A \cup B},$$

wherein A represents the first identifier set, B represents one of the second identifier sets, and S represents the similarity between the first identifier set and the second identifier sets.

8. A method for searching a nearby apparatus, adapted for searching the nearby apparatus located near a first apparatus, comprising:

searching at least one hotspot nearby by using a wireless communication technique, obtaining an identifier of each hotspot to generate a first identifier set, and uploading the first identifier set to a server by the first apparatus;

searching at least one hotspot nearby by using the wireless communication technique, obtaining the identifier of each hotspot to generate a second identifier set, and uploading the second identifier set to the server by at least one second apparatus respectively;

calculating a similarity between the first identifier set and each second identifier set by the server by using a formula of:

$$S = \frac{A \cap B}{A \cup B},$$

wherein A represents the first identifier set, B represents one of the second identifier sets, and S represents the similarity between the first identifier set and the second identifier sets; and determining whether a corresponding second apparatus is the nearby apparatus located near the first apparatus according to the similarity, and providing a determination result to the first apparatus by the server.

* * * * *